United States Patent [19]

Jones

[11] E Re. 30,987

[45] Reissued Jun. 29, 1982

[54] OMNIDIRECTIONAL CLOCK

[76] Inventor: David G. Jones, 74 Junction, London N. 19, England

[21] Appl. No.: 146,387

[22] Filed: May 5, 1980

Related U.S. Patent Documents

Reissue of:

[64] Patent No.: 4,144,708
Issued: Mar. 20, 1979
Appl. No.: 761,610
Filed: Jan. 24, 1977

[51] Int. Cl.[3] ..... G04B 19/00

[52] U.S. Cl. ..... 368/76; 368/223

[58] Field of Search ..... 368/76, 78, 79, 80, 368/223, 228, 232, 235

[56] References Cited

U.S. PATENT DOCUMENTS 2,757,508 8/1956 Zanetti ..... 368/235
3,587,222 6/1971 Mestrovic ..... 368/78
3,702,531 11/1972 Maue ..... 368/78
3,875,736 4/1975 Gulko ..... 368/76

*Primary Examiner*—Vit W. Miska
*Attorney, Agent, or Firm*—Prutzman, Kalb, Chilton & Alix

[57] ABSTRACT

A clock has a clock face in the form of an axially symmetric solid, e.g. a sphere, a cone or a cylinder. Clock hands extend around the clock face following a helical path, and time-indicating markings are arranged on all the surfaces of the face. It is therefore possible for a complete set of these markings to be seen from any direction relative to the clock face. The hands are normally driven by a conventional clock movement, there being an hour hand and a minute hand. However, it would be possible in some applications to have only a single hand, e.g. a minute hand, and to drive the clock face relative to the hand. The markings are arranged along helical paths, corresponding to the helical shape of the hands.

12 Claims, 7 Drawing Figures

OMNIDIRECTIONAL CLOCK

Matter enclosed in heavy brackets [ ] appears in the original patent but forms no part of this reissue specification; matter printed in italics indicates the additions made by reissue.

The invention relates to a clock.

According to the invention there is provided a clock having an axially symmetric clock face with a set of markings thereon arranged so that a complete set can be seen from any direction relative to the clock face, and helical hands arranged for rotation relative to the face about the axis of symmetry.

The invention will be further described with reference to the accompanying drawings, which illustrate various embodiments of the invention, which are given by way of example.

Figure 1:
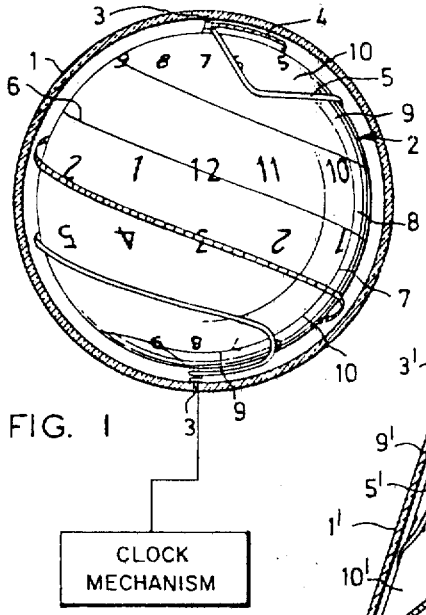
FIG. 1 is a side view of a clock constituting a first embodiment of the invention.
Figure 2:
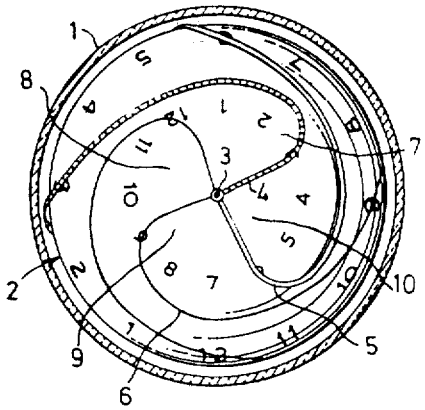
FIG. 2 is a plan view of the clock of FIG. 1.

The clock of FIG. 1 consists of a fixed outer transparent sphere 1 within which an inner opaque sphere 2 is non-rotatably mounted by means of pins 3, the inner sphere 2 being provided with an hour hand 4 and a minute hand 5 rotated about the pins 3 by a known clockwork mechanism (not shown) located inside the inner sphere 2. In this case the hour hand 4 is striped while the minute hand 5 is plain but they could of course be differentiated from each other in other ways. Both hands 4 and 5 have the same generally helical shape. Following the helix from one pin 3 to the other pin 3 completes a 360° turn, or somewhat more than 360°, about the axis joining the pins 3. The surface of the sphere 2 is divided by four lines 6 (two of which are hidden in the Figures by the arms 4, 5), of the same helical shape as the arms 4, 5 into differently coloured regions 7, 8, 9, and 10. For example, region 7 could be red while region 8 was blue, region 9 yellow and region 10 green, to form a set of markings, but other ways of visually differentiating the regions could be employed. Additionally, the surface of the inner sphere 2 bears numbers to assist in indicating the time, the numbers being upright in the upper hemisphere and inverted in the lower. The quantity of sets of numbers could be varied for the sake of clarity, in clocks of various sizes.

With a little practice, it is possible to tell the time by looking at the sphere 2 from any direction. The time shown in all the figures is 3.30; the hour hand being on 3 and the minute hand on 6. The sphere 1 may be mounted on a stand or suspended from the ceiling.

Figure 3:
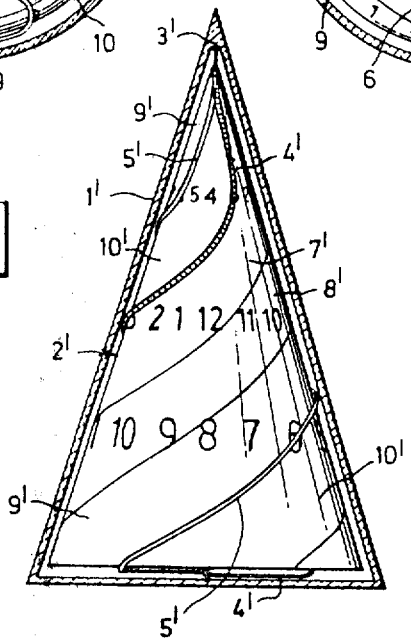
FIG. 3 is a side view of a clock constituting a second embodiment of the invention.
Figure 4:
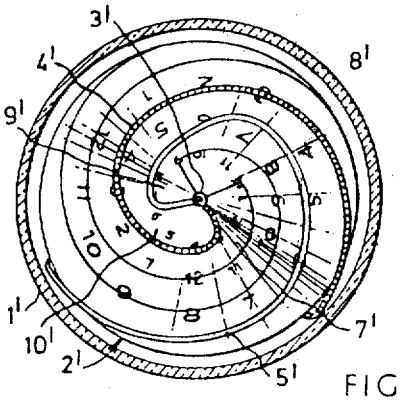
FIG. 4 is a plan view of the clock of FIG. 3.
Figure 5:
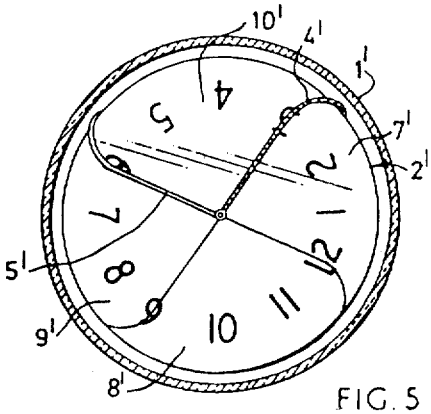
FIG. 5 is a underneath view of the clock of FIG. 3.

The embodiment shown in FIGS. 3–5 is generally similar in construction and operation to that of FIG. 1, except that the outer sphere 1 is replaced by an outer cone 1' and the inner sphere 2 by an inner cone 2'. There are also three rings of upright figures instead of two. The helical shape of the four regions 7', 8', 9' and 10' and of the hands 4' and 5' is also suitably modified. The base of the cone 2' carries a further set of numbers as shown in FIG. 5. This view corresponds to a conventional clock face, because the hands become straight where they pass over a flat surface.

Figure 6:
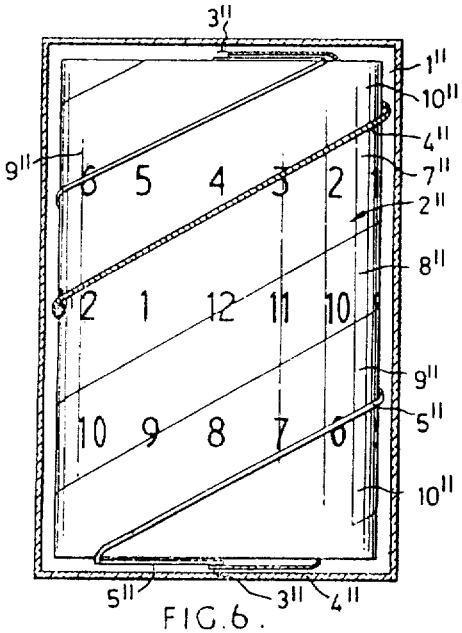
FIG. 6 is a side view of a clock constituting a third embodiment of the invention.

Yet a further embodiment is shown in FIG. 6. Here, the outer sphere 1 is replaced by an outer cylinder 1'', and the inner sphere 2 is replaced by an inner cylinder 2''. Otherwise the construction and operation of this embodiment are similar to those of FIGS. 1 and 3 with appropriate modifications the nature of which will be apparent on consideration of the embodiment of FIG. 6.

Various modifications may be made within the scope of the invention. Other axially symmetric shapes could be used. The inner sphere or other shape need not be opaque. The helical hands may make more than one turn about the axis. Series of numbers arranged along the path of the arms may replace the coloured regions. The arms may be outside the outer sphere or other shape. The arms could be driven from outside the sphere. The combination of shapes could be varied; for example an inner sphere could be arranged within an outer cone, cylinder or cube.

Figure 7:
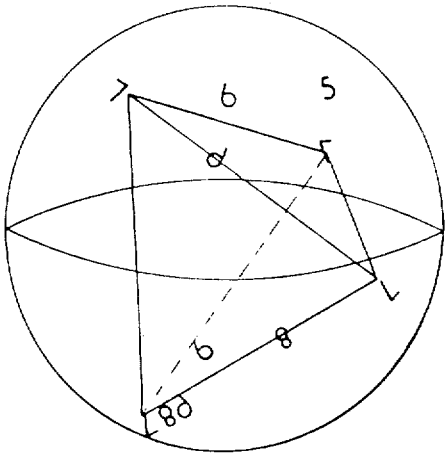
FIG. 7 is a schematic view showing how the clock face markings are distributed.

If four sets of numbers are employed, a given number, say '7' can be seen from all sides of the sphere if the '7' in each set is arranged at the corner of a rectangular tetrahedron, (see FIG. 7). If eight sets of numbers were employed, the tetrahedron would be replaced by an octahedron.

In one advantageous embodiment, the regions are coloured but transparent. This enables the movement of the clockwork mechanism to be watched but reduces the distraction caused by seeing the numbers on the other side of the sphere, when compared with an uncoloured transparent sphere.

Instead of using inner and outer spheres, a single sphere only may be employed.

I claim:

1. A clock comprising a clock face with an annular clock face surface which extends radially outwardly and axially from each end thereof toward the other end and which is thereby viewable from any radial direction and both axial directions thereof, hour and minute hands mounted coaxially with the annular clock face surface for relative rotation with respect thereto, the clock face having a plurality of at least four regularly spaced sets of time indicia each comprising a plurality of time indicia angularly spaced about the clock surface, each of said hands extending in generally spaced parallel relationship with the clock face surface between the ends thereof and extending angularly at least 360° for indicating the hour and minutes with the clock face indicia from any radial direction and both axial directions of the clock face surface, and a clock mechanism for rotating the hour and minute hands relative to the clock face.

2. A clock according to claim 1 wherein the hands are mounted to rotate outside of and close to the clock face surface.

3. A clock according to claim 1 wherein the clock face surface is divided into a plurality of angularly spaced different colored regions extending axially and angularly about the surface.

4. A clock according to claim 1 wherein each set of time indicia comprises a circular arrangement of numerals coaxial with the clock face surface.

5. A clock according to claim 1 wherein the clock face has a generally sphere-shaped surface.

6. A clock according to claim 1 wherein the clock face surface comprises an axially facing generally flat annular portion at least at one axial end of the clock face, wherein the sets of indicia include a set of indicia angularly spaced about said axially facing annular portion, and wherein the hour and minute hands each extend generally radially along said annular portion for reading the hour and minutes respectively from said one axial end of the clock face.

*7. A clock comprising a clock face with an annular clock face surface of revolution which extends radially outwardly and axially from each end thereof toward the other end and which is thereby viewable from any radial direction and both axial directions thereof, hour and minute hands mounted coaxially with the annular clock face surface for relative rotation with respect thereto, the clock face having a plurality of at least four regularly spaced sets of time indicia each comprising a plurality of time indicia angularly spaced about the clock surface, each of said hands cooperating with the clock face surface between the ends thereof and extending angularly sufficiently for indicating the hour and minutes with the clock face indicia from any radial direction and both axial directions of the clock face surface, and a clock mechanism for rotating the hour and minute hands relative to the clock face.*

*8. A clock according to claim 7 wherein the hands are mounted to rotate outside of and close to the clock face surface.*

*9. A clock according to claim 7 wherein the clock face surface is divided into a plurality of angularly spaced different colored regions extending axially and angularly about the surface.*

*10. A clock according to claim 7 wherein each set of time indicia comprises a circular arrangement of numerals coaxial with the clock face surface.*

*11. A clock according to claim 7 wherein the clock face has a generally sphere-shaped surface.*

*12. A clock according to claim 7 wherein the clock face surface comprises an axially facing generally flat annular portion at least at one axial end of the clock face, wherein the sets of indicia include a set of indicia angularly spaced about said axially facing annular portion, and wherein the hour and minute hands each extend generally radially along said annular portion for reading the hour and minutes respectively from said one axial end of the clock face.*

* * * * *